United States Patent
Omori et al.

(10) Patent No.: US 11,528,485 B2
(45) Date of Patent: Dec. 13, 2022

(54) ENCODING APPARATUS AND PROGRAM

(71) Applicant: NIPPON TELEGRAPH AND TELEPHONE CORPORATION, Tokyo (JP)

(72) Inventors: Yuya Omori, Musashino (JP); Takayuki Onishi, Musashino (JP); Hiroe Iwasaki, Musashino (JP); Atsushi Shimizu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/414,889

(22) PCT Filed: Dec. 5, 2019

(86) PCT No.: PCT/JP2019/047670
§ 371 (c)(1),
(2) Date: Jun. 16, 2021

(87) PCT Pub. No.: WO2020/129681
PCT Pub. Date: Jun. 25, 2020

(65) Prior Publication Data
US 2022/0078437 A1    Mar. 10, 2022

(30) Foreign Application Priority Data

Dec. 19, 2018 (JP) .............................. JP2018-237633

(51) Int. Cl.
*H04N 19/00* (2014.01)
*H04N 19/137* (2014.01)
*H04N 19/105* (2014.01)
*H04N 19/159* (2014.01)
*H04N 19/176* (2014.01)

(52) U.S. Cl.
CPC ......... *H04N 19/137* (2014.11); *H04N 19/105* (2014.11); *H04N 19/159* (2014.11); *H04N 19/176* (2014.11)

(58) Field of Classification Search
CPC ................................................ H04N 19/00
See application file for complete search history.

(56) References Cited

FOREIGN PATENT DOCUMENTS

| JP | 2015111774 | * | 6/2015 | ............. H04N 19/56 |
| JP | 2015111774 A | | 6/2015 | |
| JP | 6259272 B2 | | 1/2018 | |

* cited by examiner

*Primary Examiner* — Maryam A Nasri

(57) ABSTRACT

A coding device executes coding having divided an image into blocks, and includes: a candidate obtainment unit that obtains a plurality of provisional motion vector candidates in a coding target block; an evaluation information obtainment unit that obtains a correspondence vector that is a vector having a same direction and a same magnitude as a direction and a magnitude of the obtained provisional motion vector candidates, and evaluation information of a search center indicated by the correspondence vector in a coded block; and a selection unit that, on the basis of the evaluation information, selects, from the plurality of provisional motion vector candidates, a number of motion vector candidates that is lower than the number of the plurality of provisional motion vector candidates.

9 Claims, 9 Drawing Sheets

Fig. 4

ENCODING APPARATUS AND PROGRAM

CROSS-REFERENCE TO RELATED APPLICATIONS

This application is a 371 U.S. National Phase of International Application No. PCT/JP2019/047670 filed on Dec. 5, 2019, which claims priority to Japanese Application No. 2018-237633 filed on Dec. 19, 2018. The entire disclosures of the above applications are incorporated herein by reference.

TECHNICAL FIELD

The present invention relates to a coding device and a program.

BACKGROUND ART

Moving image coding standards include standards such as MPEG (Moving Picture Experts Group)-2, MPEG-4, MPEG-4/AVC (Advanced Video Coding), and the like. HEVC (High Efficiency Video Coding) is a next-generation moving image coding standard that is expected to spread in the future.

A moving image coding standard defines intra-frame coding, in which the coding processing is executed using information within a single image frame, and inter-frame coding, in which the coding processing is executed using information from a plurality of image frames in time series. In inter-frame coding, the coding device executes processing which searches for a motion vector (called "motion search processing" hereinafter) using the image to be coded and a reference image. The motion vector is a vector indicating coordinates in the reference image where a cumulative value or the like of a pixel-by-pixel difference between the image to be coded and the reference image (an inter-frame difference value) is the lowest.

The coding device reduces the amount of information in a coding result by coding the motion vectors and inter-frame difference values. To reduce the amount of information in the coded motion vectors and inter-frame difference values, it is necessary for the coding device to search for a motion vector having good accuracy. The motion search processing, which searches for accurate motion vectors, requires an enormous amount of computation. In the motion search processing, the coding device derives the inter-frame difference value between the image to be coded and the reference image in whole number or fractional pixel units. It is for this reason that the motion search processing requires an enormous amount of computation.

With a coding device, there are situations where a search region (a region containing a search center) within the reference image where the motion search processing is executed is determined before the formal motion search processing (the actual motion search processing). In this case, the coding device executes processing for searching for motion vectors on the search region before the formal motion search processing (advance search processing).

In the advance search processing, the coding device determines a search region within a reduced-size reference image using a reduced-size image to be coded. The coding device reduces the image to be coded and the reference image to a size in which the pixels are one-eighth of their lengths, for example. The coding device executes the advance search processing on the search region in the reduced-size image to be coded and reference image in pixel units having a length of one-eighth of a pixel (fractional pixel units), for example.

In the advance search processing, the coding device derives a motion vector having a rough level of accuracy for the reduced-size image to be coded. The coding device determines, as the search center within the reference image for the formal motion search processing, a position indicated by a motion vector having the lowest inter-frame difference value among the multiple motion vectors searched out through the advance search processing. The coding device then executes the formal motion search processing on a region containing the search center determined in the advance search processing (the search region).

Motion Vector Prediction (MVP) is defined in MPEG-4/AVC and HEVC. In motion vector prediction, the coding device derives a prediction vector, which is a vector of a result of motion vector prediction (MVP) in a target block, on the basis of motion vectors in the blocks surrounding the coding target block. The coding device codes a difference between the pixel value at a position, in the target block, indicated by the final motion vector, and the pixel value at a position indicated by the prediction vector of the motion vector prediction (a prediction residual). Accordingly, the coding device can improve the coding efficiency by efficiently searching for a position which is close to the position indicated by the prediction vector in the motion vector prediction and which has a low prediction residual.

There are therefore situations where the coding device executes motion search processing on a search region that contains the search center, using the position indicated by the prediction vector in the motion vector prediction as the search center. In HEVC, there are two types of prediction vectors: a left prediction vector (left MVP), which is determined on the basis of the block located to the left of the coding target block, and an upper prediction vector (upper MVP), which is determined on the basis of the block located above the coding target block.

The coding device selects, from these two types of prediction vectors, a prediction vector that makes it possible to increase the coding efficiency. Because the coding device searches the search region including the search center indicated by each prediction vector, there are situations where HEVC has a greater amount of processing in the motion search processing (search processing amount) than the amount of processing in the motion search processing of MPEG-4/AVC.

For this reason, the motion search processing in HEVC uses a plurality of search center candidates originating from an advance search vector "MVpre", which is the vector resulting from the advance search processing, and the prediction vector in the motion vector prediction. To further reduce the amount of processing in the motion search processing, it is necessary for the coding device to select (narrow down) the search center candidates from among the plurality of search center candidates and execute the formal motion search processing on a small search region containing the small number of selected search center candidates. In particular, when the coding device is implemented using hardware such as LSI (Large Scale Integration) or an FPGA (Field Programmable Gate Array), the circuit scale can be reduced if the amount of processing in the motion search processing for each block is below a certain level.

To reduce the circuit scale of the hardware, there are situations where the search center candidates are selected so that the number of search center candidates in each block is no greater than a certain number. According to PTL 1, when deriving an accurate motion vector in advance search processing performed on a reduced-size image, a coding device compares cost values of prediction vectors in motion vector prediction performed on the reduced image (see PTL 1).

Because the search region in the advance search processing is broad, the search center candidates indicated by the prediction vectors in the motion vector prediction are often contained within the search region used in the advance search processing. Accordingly, the coding device can obtain the cost value of each prediction vector in the motion vector prediction performed on the reduced-size image when deriving the motion vectors in the advance search processing, even without executing additional advance search processing.

In PTL 1, when deriving the motion vectors in the advance search processing, the coding device derives an accurate motion vector and cost value derived in the advance search processing performed on the reduced-size image, and also derives the cost values of two prediction vectors in the motion vector prediction performed on that reduced-size image. The coding device then selects two search center candidates from three search center candidates on the basis of results of comparing the three cost values with a threshold. Then, the coding device executes the formal motion search processing on the basis of the two selected search center candidates.

CITATION LIST

Patent Literature

[PTL 1] Japanese Patent No. 6259272

SUMMARY OF THE INVENTION

Technical Problem

However, according to PTL 1, the prediction vectors in the motion vector prediction performed in the advance search processing are different from the prediction vectors in the motion vector prediction performed in the formal motion search processing which follows the advance search processing. MPEG-4/AVC and HEVC also support motion vectors in small units of pixels, and the coding device therefore executes the formal motion search processing in small block units. In HEVC in particular, it is possible for blocks as small as, for example, 8×8 pixels to have a motion vector.

Conventional coding devices execute the advance search processing on a reduced-size image, and the advance search processing is therefore executed on a search region which had large block units prior to the size reduction. For example, a conventional coding device first reduces a 32×32-pixel block to a size which is one-eighth the length, i.e., a 4×4-pixel block, and then executes the advance search processing on the search region in units of blocks in the reduced-size image. Assuming that the blocks in an unreduced image in the advance search processing and the blocks in the image in the formal motion search processing are similarly small blocks, the blocks in the reduced-size image in the advance search processing will be too small, e.g., 2×2 pixels. It is difficult for a conventional coding device to capture the general motion between frames using blocks that are too small in this manner. Thus for a coding device to capture the general motion between frames, it is necessary for the blocks in the search region to have different sizes between the advance search processing and the formal motion search processing.

The prediction vector in motion vector prediction is a motion vector in a block which is at a position relative to the target block (e.g., to the left or above the target block). Accordingly, when the size of the blocks in the search region differs between the advance search processing and the formal motion search processing, the prediction vectors in the motion vector prediction will also differ between the advance search processing and the formal motion search processing. Assuming the advance search processing is executed in blocks of 32×32 pixels and the formal motion search processing is executed in blocks of 8×8 pixels, the 32×32 pixel blocks will have one set of prediction vectors, i.e., a left prediction vector and an upper prediction vector, in the advance search processing.

A 32×32-pixel block is constituted by 16 blocks, each of which is 8×8 pixels. In the formal motion search processing, each block of 32×32 pixels has one set of prediction vectors in the motion vector prediction. In contrast, in the advance search processing, each block of 32×32 pixels may have 16 sets of different left prediction vectors and upper prediction vectors. Even if, in the advance search processing, the coding device selects the search center candidates indicated by the prediction vectors in the motion vector prediction, the prediction vectors in the motion vector prediction performed in the formal motion search processing will be different from the prediction vectors in the motion vector prediction for which the cost values are compared in the advance search processing, which causes a drop in the coding efficiency.

In this manner, a conventional coding device selects search center candidates in units of image blocks in the advance search processing. The size of the image blocks in the advance search processing is often larger than the size of the image blocks in the formal motion search processing. As a result, the conventional coding device cannot switch the processing performed on the search center candidates in units of image blocks in the formal motion search processing, which causes a drop in the coding efficiency. Thus the conventional coding device has a problem in that when the search processing amount is reduced, a drop in the coding efficiency cannot be suppressed.

In view of the foregoing circumstances, an object of the present invention is to provide a coding device and a program capable of suppressing a drop in coding efficiency even when a search processing amount has been reduced.

Means for Solving the Problem

One aspect of the present invention is a coding device that executes coding having divided an image into blocks, the device including: a candidate obtainment unit that obtains a plurality of provisional motion vector candidates in a coding target block; an evaluation information obtainment unit that obtains a correspondence vector that is a vector having a same direction and a same magnitude as a direction and a magnitude of the obtained provisional motion vector candidates, and evaluation information of a search center indicated by the correspondence vector in a coded block; and a selection unit that, on the basis of the evaluation information, selects, from the plurality of provisional motion vector candidates, a number of motion vector candidates that is lower than the number of the plurality of provisional motion vector candidates.

One aspect of the present invention is the above-described coding device, in which the correspondence vector is the provisional motion vector candidate when the coded block is the coding target block.

One aspect of the present invention is the above-described coding device, in which the evaluation information obtainment unit: sets the evaluation information of the provisional motion vector candidate of the correspondence vector for which a search center is located in a search region of the coded block to be equal to the evaluation information of the correspondence vector; and sets the evaluation information of the provisional motion vector candidate of the correspondence vector for which a search center is not located in the search region of the coded block to be equal to a result of adding a code amount of the provisional motion vector candidate after being coded and a fixed value.

One aspect of the present invention is the above-described coding device, in which the evaluation information of the correspondence vector is a value of a result of adding a code amount of the provisional motion vector candidate after being coded and a sum of absolute differences of a pixel value.

One aspect of the present invention is the above-described coding device, in which the coded block: is a block to the left of the coding target block when the coding target block is not a block at a left edge of the image; and is a block above the coding target block when the coding target block is a block at the left edge of the image.

One aspect of the present invention is a program for causing a computer to function as the above-described coding device.

Effects of the Invention

According to the present invention, a drop in coding efficiency can be suppressed even when a search processing amount has been reduced.

BRIEF DESCRIPTION OF DRAWINGS

FIG. 4 is a diagram illustrating an example of a coding tree unit, an advance search unit, and a prediction unit according to an embodiment.

DESCRIPTION OF EMBODIMENTS

Embodiments of the present invention will be described in detail with reference to the drawings.

First Embodiment

Figure 1:
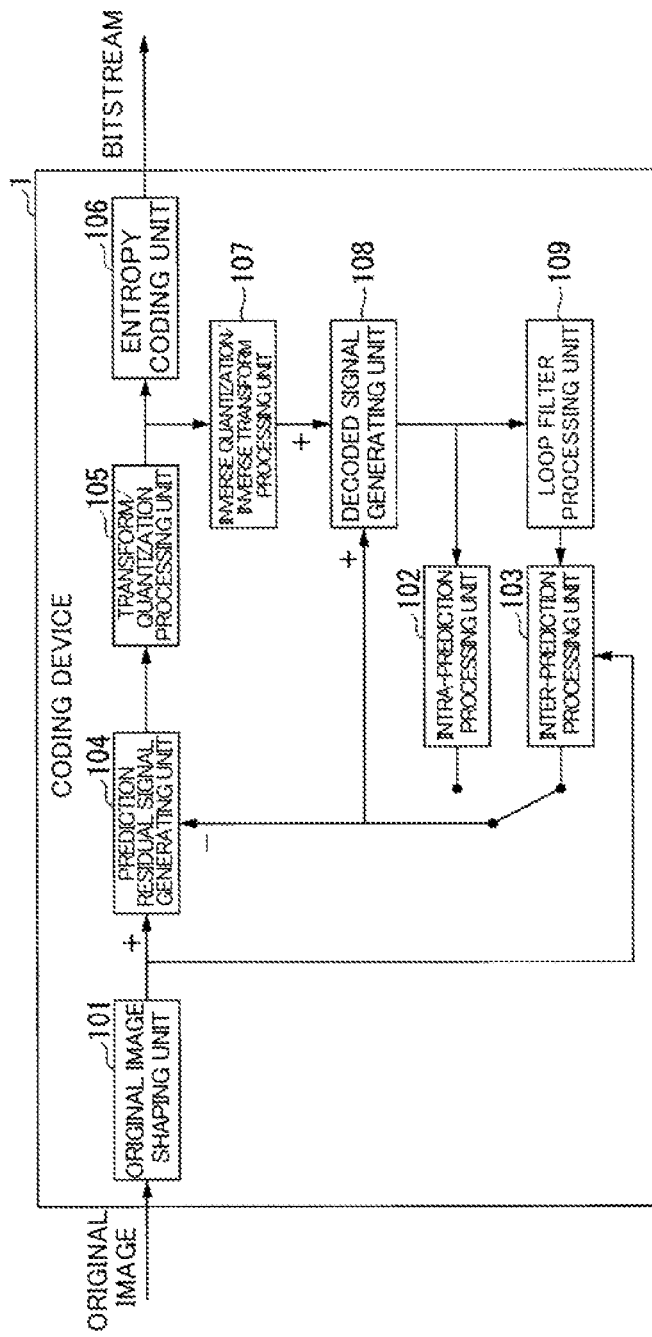
FIG. 1 is a diagram illustrating an example of the configuration of a coding device according to an embodiment.

FIG. 1 is a diagram illustrating an example of the configuration of a coding device 1. The coding device 1 is a device that codes signals such as moving images and the like. The coding device 1 encodes, for example, a frame of a moving image (an original image) on the basis of specified parameters 7. The following assumes that the coding device 1 executes moving image coding processing according to H.264/AVC, HEVC, or the like, for example. The coding device 1 executes the coding processing in units of target blocks. In HEVC, the target block (coding block) is called a Coding Unit (CU). The coding units constitute a coding tree unit (CTU).

The coding device 1 includes an original image shaping unit 101, an intra-prediction processing unit 102, an inter-prediction processing unit 103, a prediction residual signal generating unit 104, a transform/quantization processing unit 105, an entropy coding unit 106, an inverse quantization/inverse transform processing unit 107, a decoded signal generating unit 108, and a loop filter processing unit 109.

Some or all of the functional units of the coding device 1 are realized using hardware such as LSI, for example. Some or all of the functional units of the coding device 1 may be realized as software by a processor such as a Central Processing Unit (CPU) executing programs stored in a storage unit. The storage unit is preferably a non-volatile storage medium (non-transitory recording medium) such as flash memory or HDD (Hard Disk Drive), for example. The storage unit may include a volatile recording medium such as RAM (Random Access Memory). The storage unit stores programs and image data, for example.

The original image shaping unit 101 acquires an original image signal (frames of a moving image) in raster scan order. The original image shaping unit 101 shapes the original image data into target block units. The original image shaping unit 101 outputs the original image data to the prediction residual signal generating unit 104 and the inter-prediction processing unit 103 in units of target blocks.

The intra-prediction processing unit 102 obtains a decoded signal from the decoded signal generating unit 108. The intra-prediction processing unit 102 executes intra-prediction on a target frame of the decoded signal.

The inter-prediction processing unit 103 obtains the original image signal from the original image shaping unit 101 in units of target blocks. The inter-prediction processing unit 103 obtains, as a reference image signal, the decoded signal which has been subjected to filtering processing from the loop filter processing unit 109.

The prediction residual signal generating unit 104 obtains the original image signal from the original image shaping unit 101 in units of target blocks. The prediction residual signal generating unit 104 obtains a predictive signal from the intra-prediction processing unit 102 or the inter-prediction processing unit 103. When the prediction residual signal generating unit 104 obtains the predictive signal from the intra-prediction processing unit 102, the predictive signal contains information representing the result of the intra-prediction. When the prediction residual signal generating unit 104 obtains the predictive signal from the inter-prediction processing unit 103, the predictive signal contains information representing the result of the inter-prediction.

The prediction residual signal generating unit 104 outputs a difference between the original image signal and the predictive signal to the transform/quantization processing unit 105 as a prediction residual signal.

The transform/quantization processing unit 105 executes a direct cosine transform such as a discrete cosine transform on the prediction residual signal. The transform/quantization processing unit 105 quantizes transform coefficients. The transform/quantization processing unit 105 outputs the quantized transform coefficients to the entropy coding unit 106 and the inverse quantization/inverse transform processing unit 107.

The entropy coding unit 106 entropy-codes the quantized transform coefficients. The entropy coding unit 106 outputs a bitstream of the entropy-coded transform coefficients to an external device such as a decoding device or the like. In this manner, the coding device 1 sends, to the external device such as a decoding device, a search result from the motion search processing.

The inverse quantization/inverse transform processing unit 107 obtains the quantized transform coefficients from the transform/quantization processing unit 105. The inverse quantization/inverse transform processing unit 107 executes inverse quantization and inverse direct cosine transform processing on the quantized transform coefficients. The inverse quantization/inverse transform processing unit 107 then outputs a prediction residual decoded signal, which is a result of the inverse quantization and inverse direct cosine transform processing, to the decoded signal generating unit 108.

The decoded signal generating unit 108 obtains a predictive signal from the intra-prediction processing unit 102 or the inter-prediction processing unit 103. The decoded signal generating unit 108 generates a decoded signal of the coded target block by adding the prediction residual decoded signal to the predictive signal.

The loop filter processing unit 109 executes filtering processing in which coding distortion is reduced on the decoded signal. The loop filter processing unit 109 outputs, as a reference image signal, the decoded signal which has been subjected to the filtering processing, to the inter-prediction processing unit 103.

An example of the configuration of the inter-prediction processing unit 103 will be described in detail next.

Figure 2:
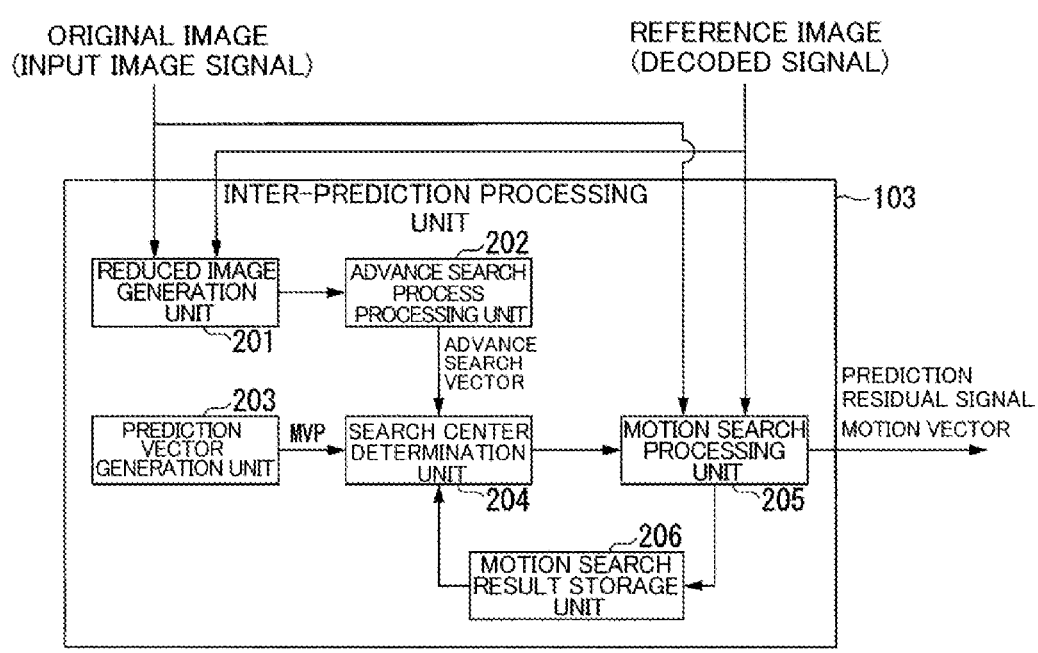
FIG. 2 is a diagram illustrating an example of the configuration of an inter-prediction processing unit according to an embodiment.

FIG. 2 is a diagram illustrating an example of the configuration of the inter-prediction processing unit 103. The inter-prediction processing unit 103 includes a reduced image generation unit 201, an advance search process processing unit 202, a prediction vector generation unit 203, a search center determination unit 204, a motion search processing unit 205, and a motion search result storage unit 206.

The reduced image generation unit 201 obtains the original image and the reference image. The reduced image generation unit 201 executes reduction processing on the original image. The reduced image generation unit 201 executes reduction processing on the reference image at the same reduction rate as the reduction rate used for the original image. The reduced image generation unit 201 outputs the reduced original image and reference image to the advance search process processing unit 202.

The advance search process processing unit 202 executes advance search processing using the reduced original image and reference image. The advance search process processing unit 202 takes an accurate motion vector, which is a result of the advance search processing, and outputs that motion vector to the search center determination unit 204 as a single advance search vector on a prediction block-by-prediction block basis. In HEVC, the prediction block (motion compensation block) is a prediction unit (PU).

The prediction vector generation unit 203 derives a prediction vector for motion vector prediction in the target block on a prediction block-by-prediction block basis by executing motion vector prediction on the basis of motion vectors of the blocks surrounding the target block. HEVC defines two types of motion vector prediction, and thus the prediction vector generation unit 203 outputs two prediction vectors to the search center determination unit 204 for each prediction block.

The HEVC standard defines two methods of motion vector prediction in which prediction vectors are derived for each coding processing target block. In HEVC, the coding device can select a prediction vector having good coding efficiency. As such, the prediction vector generation unit 203 derives two prediction vectors.

The search center determination unit 204 (a vector obtainment unit) obtains a single advance search vector for each prediction block as a vector indicating a single search center candidate (called a "search center candidate vector" hereinafter) from the advance search process processing unit 202. The search center determination unit 204 obtains the two prediction vectors for each prediction block as vectors indicating two search center candidates (search center candidate vectors) from the prediction vector generation unit 203.

The search center determination unit 204 obtains, from the motion search result storage unit 206, a result of motion search processing performed on a prediction block earlier in terms of time (in the past) than the motion search processing performed on the current prediction block. In other words, from the search center candidate vectors of the prediction block immediately before the current prediction block (in the past), the search center determination unit 204 obtains, from the motion search result storage unit 206, a vector corresponding to a single advance search vector in the current prediction block as a search center candidate vector of the current prediction block. From the search center candidate vectors of the prediction block immediately before the current prediction block (in the past), the search center determination unit 204 obtains, from the motion search result storage unit 206, vectors corresponding to the two prediction vectors in the current prediction block as the search center candidate vectors of the current prediction block.

A vector corresponding to a search center candidate vector will be called a "correspondence vector" hereinafter. In other words, the correspondence vector is a past search center candidate vector from when a target block which has already been coded was the coding target block (a provisional motion vector candidate). The direction and magnitude of the correspondence vector for the search center candidate vector is the same as the direction and magnitude of that search center candidate vector.

The search center determination unit 204 selects two search center candidate vectors from among the three search center candidate vectors on the basis of a result of the motion search processing performed on the past prediction block. The search center determination unit 204 outputs the two selected search center candidate vectors to the motion search processing unit 205.

The search center determination unit 204 selects an optimal search center candidate vector from among the one advance search vector and the two prediction vectors in the one prediction block immediately before the current prediction block. Through this, the search center determination unit 204 can reduce the processing amount for the motion search processing without reducing the coding efficiency.

The motion search processing unit 205 obtains the original image and the reference image. The motion search processing unit 205 executes the motion search processing on a prediction block-by-prediction block basis in a region containing a search center indicated by the search center candidate vector selected by the search center determination unit 204. The motion search processing unit 205 outputs the selected motion vector (a finalized motion vector) and a predicted difference image (a predicted difference signal) to the prediction residual signal generating unit 104.

The motion search result storage unit 206 stores the one advance search vector and the two prediction vectors for the current single prediction block as a motion search processing result for a set period of time. The one advance search vector and the two prediction vectors which are stored are used by the search center determination unit 204 in the processing for selecting the optimal search center candidate vector in the next prediction block following the current single prediction block.

The prediction vector generation unit 203 will be described in detail next.

Figure 3:
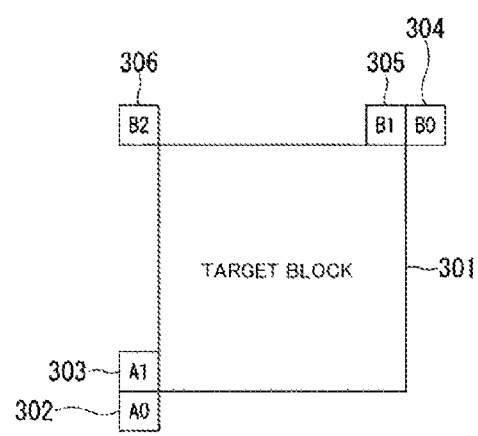
FIG. 3 is a diagram illustrating an example of each of pixels adjacent to a coding processing target block according to an embodiment.

FIG. 3 is a diagram illustrating an example of each of pixels adjacent to a coding processing target block 301. When a coding mode of a coded target block (peripheral block) containing a pixel 302 "A0" to the lower-left of the target block 301 is a coding mode having a motion vector, the prediction vector generation unit 203 takes the motion vector of the coded target block containing the pixel 302 "A0" as a prediction vector "MVP1". If the coding mode of the coded target block containing the pixel 302 "A0" to the lower-left of the target block 301 is not a coding mode having a motion vector, the prediction vector generation unit 203 takes the motion vector of a coded target block containing a pixel 303 "A1" as the prediction vector "MVP1".

The prediction vector generation unit 203 determines a prediction vector for a pixel above the target block 301 in the same manner. In a case such as that described next, the prediction vector generation unit 203 takes the motion vector of a coded target block containing a pixel 304 "B0" as a prediction vector "MVP2". The stated case is one in which the coding mode of the coded target block containing the pixel 304 "B0" to the upper-right of the target block 301 (a peripheral block) is a coding mode having a motion vector. When the coding mode of the coded target block containing the pixel 304 "B0" to the upper-right of the target block 301 is not a coding mode having a motion vector, the prediction vector generation unit 203 performs a determination as follows. The stated determination is a determination as to whether or not the coding mode of the coded target block containing a pixel 305 "B1" on the upper-right of the target block 301 is a coding mode having a motion vector. When the coding mode of the coded target block containing the pixel 305 "B1" on the upper-right of the target block 301 is a coding mode having a motion vector, the prediction vector generation unit 203 takes the motion vector of the coded target block containing the pixel 305 "B1" as the prediction vector "MVP2". When the coding mode of the coded target block containing the pixel 305 "B1" on the upper-right of the target block 301 is not a coding mode having a motion vector, the prediction vector generation unit 203 takes the motion vector of a coded target block containing a pixel 306 "B2" as the prediction vector "MVP2".

In this manner, the prediction vector generation unit 203 generates the one prediction vector "MVP1" for the motion vector prediction on the basis of the pixel 302 or the pixel 303. The prediction vector generation unit 203 generates the one prediction vector "MVP2" for the motion vector prediction on the basis of the pixel 304, the pixel 305, or the pixel 306. The prediction vector generation unit 203 outputs the prediction vectors "MVP1" and "MVP2" for the motion vector prediction to the search center determination unit 204. Note that the prediction vector generation unit 203 may output the motion vector of a target block (peripheral block) partway through coding as the prediction vector.

In HEVC, the coding device executes the motion vector prediction and motion compensation processing in units of prediction blocks (prediction units). The size of the prediction block ranges from 8×8 pixels to 64×64 pixels. When the size of the prediction block on which the formal motion search processing is performed is small, such as 8×8 pixels, the prediction block will have a very small size, such as 2×2 pixels, as a result of the original image being reduced by the reduced image generation unit 201. This reduces the accuracy of the motion vectors in the advance search processing.

In a case such as that described below as well, there are situations where the advance search process processing unit 202 executes the advance search processing on a prediction block having a large size, such as 32×32 pixels, in order to ensure that the accuracy of the motion vectors does not drop in the advance search processing. The stated case is a case where the size of the prediction block on which the formal motion search processing is executed after the advance search processing is small, such as 8×8 pixels. In this case, the size of the prediction block in the advance search processing executed by the advance search process processing unit 202 is different from the size of the prediction block in the formal motion search processing executed by the motion search processing unit 205. An advance search vector "MVpre" is generated by the advance search process processing unit 202 for each prediction block having a large size, such as 32×32 pixels.

Figure 4:
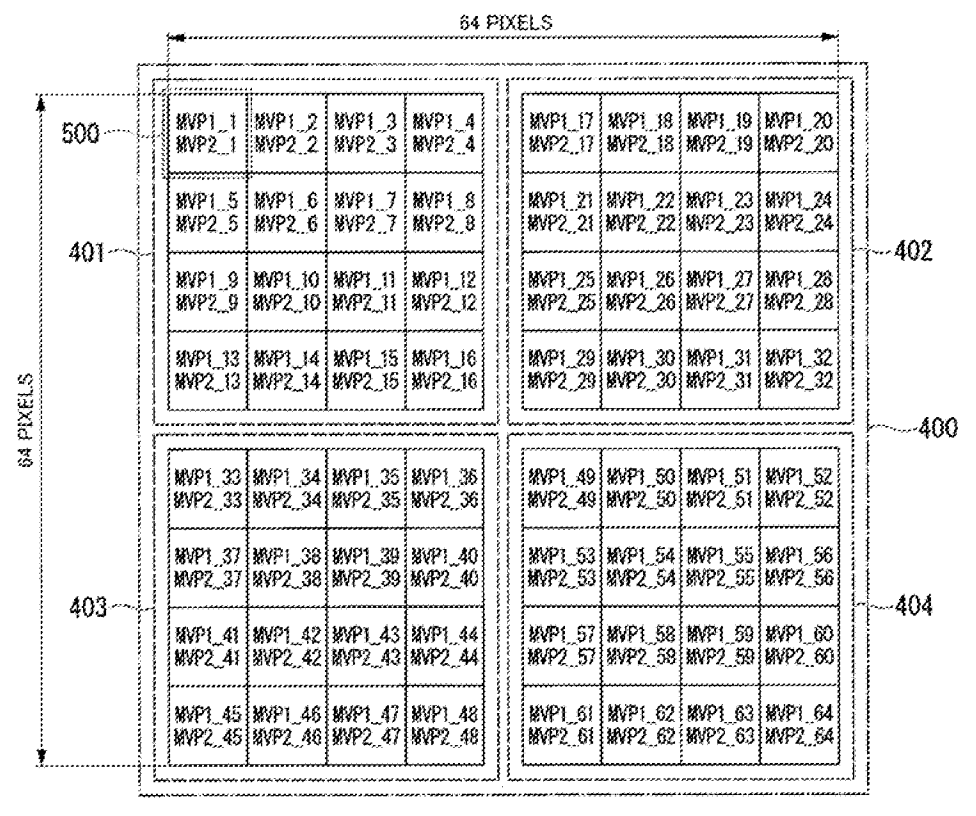

FIG. 4 is a diagram illustrating an example of a coding tree unit (CTU), an advance search unit, and a prediction unit (PU). In FIG. 4, the size of a coding tree unit 400, which is constituted by a plurality of coding units that are the target blocks (coding blocks), is 64×64 pixels. The size of an advance search unit 401, which is the unit in which the advance search processing is executed by the advance search process processing unit 202, is 32×32 pixels. The size of a prediction unit 500, which is the unit in which the motion search processing is performed by the motion search processing unit 205, is 8×8 pixels.

The search center candidates indicated by the prediction vectors "MVP1" and "MVP2" differ in each prediction unit 500 having a size of 8×8 pixels. Accordingly, there are 64 sets of the prediction vectors "MVP1" and "MVP2" in the coding tree unit 400.

The search center candidate indicated by the advance search vector "MVpre" is different in each advance search unit having a size of 32×32 pixels. As such, in the coding tree unit 400, there are a total of four advance search vectors "MVpre" in advance search units 401 to 404.

Accordingly, each prediction unit includes an advance search vector indicating a single search center candidate and prediction vectors indicating two search center candidates. The sizes of the prediction unit, the advance search unit, and the coding tree unit which share these three search center candidates are different from each other. An example will be described in which the search center determination unit 204 selects the optimal search center candidate vector from among the three search center candidate vectors, i.e., the advance search vectors "MVpre" generated by the advance search process processing unit 202 and the prediction vectors "MVP1" and "MVP2" generated by the prediction vector generation unit 203.

Figure 5:
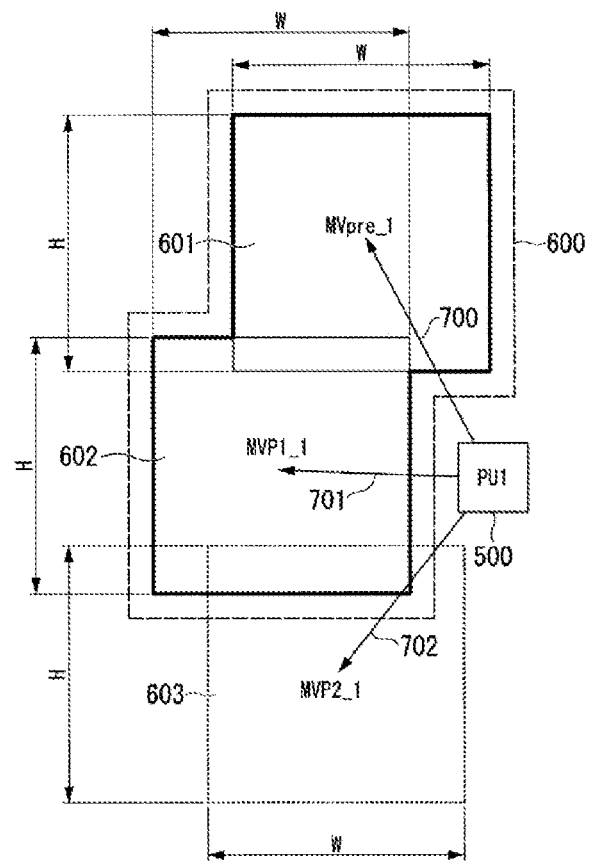
FIG. 5 is a diagram illustrating an example of a search region containing each of search ranges according to an embodiment.

FIG. 5 is a diagram illustrating an example of a search region containing each of search ranges. The following three shapes are all quadrangles having with a size of "number of horizontal pixels×number of vertical pixels=W×H". The first is the shape of a search range 601, which contains the search center candidate indicated by an advance search vector 700 "MVpre_1". The second is the shape of a search range 602, which contains the search center candidate indicated by a prediction vector 701 "MVP1_1". The third is the shape of a search range 603, which contains the search center candidate indicated by a prediction vector 702 "MVP2_1". When the advance search vector 700 "MVpre_1" and the prediction vector 701 "MVP1_1" have been selected as two search center candidate vectors for the prediction unit 500, a search region 600 includes each search center candidate indicated by the two search center candidate vectors. For the prediction unit 500, the search region 600 does not include the search range 603, which contains the search center candidate indicating the prediction vector 702 "MVP2_1" that has not been selected.

In the following, a cost value is information expressing an evaluation (evaluation information). A low cost value indicates a higher evaluation. Search center candidate vectors having lower cost values (higher evaluations) are more suitable search center candidate vectors, and are therefore more likely to be selected by the search center determination unit 204. As one example, the cost value is the sum (result of addition) of the code amount of a motion vector roughly estimated when the motion vector is coded (called a "motion vector cost value" hereinafter) and a sum of absolute differences. This sum of absolute differences may be a sum of absolute difference (SAD) between the pixel values of the original image and the pixel values of the reference image indicated by the motion vector. Alternatively, the sum of absolute differences may be a sum of absolute transformed difference (SAID) resulting from executing a two-dimensional Hadamard transform on the absolute value of the difference between the pixel values of the original image and the pixel values of the reference image indicated by the motion vector.

The motion search result storage unit 206 stores, for each of search points (pixels in the search region 600), the cost values expressing the results of the motion search processing performed on the search region 600, in the formal motion search processing, among the formal motion search processing performed on each of the prediction units, which was executed immediately previous. In FIG. 5, the motion search result storage unit 206 stores, for each of the search points, the cost values expressing the results of the motion search processing performed on the search region 600, for the prediction unit 500. The substantial number of search points is lower when the search range 601 and the search range 602 at least partially overlap than when the search range 601 and the search range 602 do not overlap at all. The motion search result storage unit 206 stores a cost value for each of a maximum of 2×W×H search points.

Figure 6:
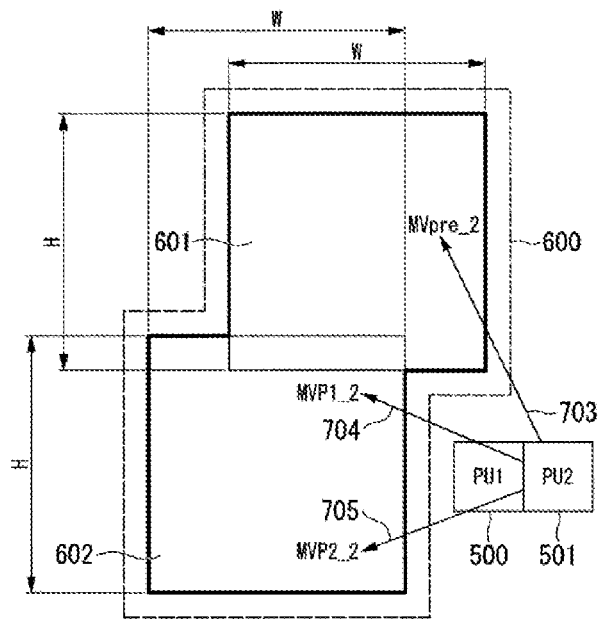
FIG. 6 is a diagram illustrating an example of an advance search vector and a prediction vector according to an embodiment.

FIG. 6 is a diagram illustrating an example of the advance search vector and the prediction vector. In a case such as that described below, the search center determination unit 204 obtains the following three vectors as the three search center candidate vectors for a prediction unit 501. Here, the stated case is a case where the motion search processing is executed on the prediction unit 501 (coding target block) next after the motion search processing performed on the prediction unit 500 (a coded block). The stated three vectors are an advance search vector 703 "MVpre_2", a prediction vector 704 "MVP1_2", and a prediction vector 705 "MVP2_2".

Figure 7:
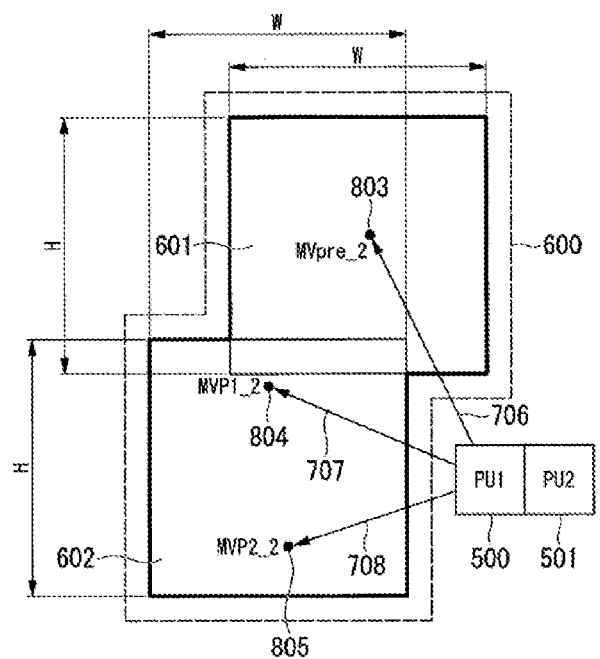
FIG. 7 is a diagram illustrating an example of correspondence vectors according to an embodiment.

FIG. 7 is a diagram illustrating an example of correspondence vectors. The search center determination unit 204 obtains, from the motion search result storage unit 206, the cost values of the vectors corresponding to the respective three search center candidate vectors in the prediction unit 501 (correspondence vectors), for the result of the formal motion search processing executed immediately previous on the prediction unit 500.

A correspondence vector 706 is a vector corresponding to the advance search vector 703 indicated in FIG. 6. The correspondence vector 706 indicates a search center candidate 803 within the search region 600. A correspondence vector 707 is a vector corresponding to the prediction vector 704 indicated in FIG. 6. The correspondence vector 707 indicates a search center candidate 804 within the search region 600. A correspondence vector 708 is a vector corresponding to the prediction vector 705 indicated in FIG. 6. The correspondence vector 708 indicates a search center candidate 805 within the search region 600.

The search center determination unit 204 (an evaluation information obtainment unit) takes the cost values of the correspondence vectors 706 to 708 in the formal motion search processing executed immediately prior on the prediction unit 500 as the following values. The stated values are the cost values of the search center candidate vectors in the formal motion search processing performed on the current prediction unit 501 (that is, the advance search vector 703, the prediction vector 704, and the prediction vector 705).

The search center determination unit 204 compares the cost values of the search center candidate vectors in the formal motion search processing performed on the current prediction unit 501. The search center determination unit 204 selects two search center candidate vectors, in order from the vector having the lowest cost value, from the three search center candidate vectors. The search center determination unit 204 takes the two selected search center candidate vectors as the two search center candidate vectors in the formal motion search processing performed on the prediction unit 501.

In this manner, the search center determination unit 204 selects two search center candidate vectors from among the three search center candidate vectors of the prediction unit 501. The search center determination unit 204 selects the two search center candidates indicated by the two selected search center candidate vectors as the two search centers in the formal motion search processing for the prediction unit 501.

Figure 8:
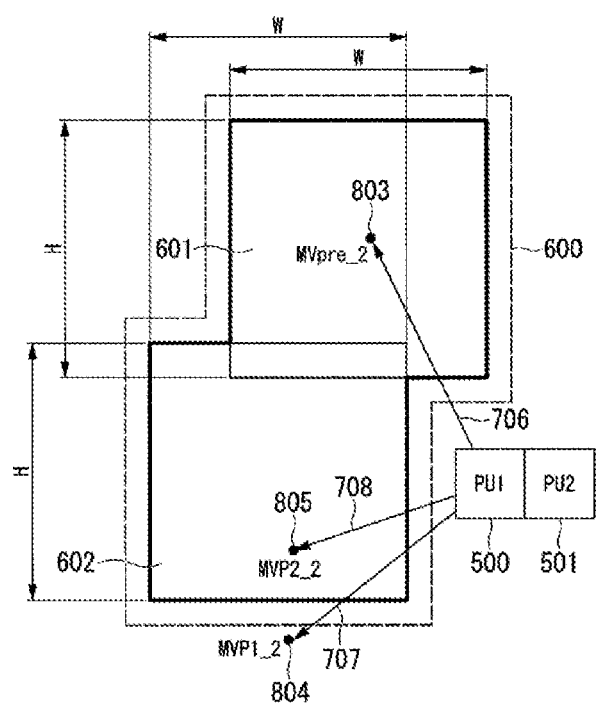
FIG. 8 is a diagram illustrating an example of a correspondence vector indicating outside a search region, according to an embodiment.

FIG. 8 is a diagram illustrating an example of a correspondence vector indicating outside the search region 600. There are situations where one of the correspondence vectors indicates outside the search region 600. The search center candidate 803 indicated by the correspondence vector 706 is located within the search region 600 of the prediction unit 500. The search center candidate 805 indicated by the correspondence vector 708 is located within the search region 600 of the prediction unit 500. The motion search result storage unit 206 therefore stores the cost value of the correspondence vector 706 and the cost value of the correspondence vector 708.

The search center candidate 804 indicated by the correspondence vector 707 is not located within the search region 600 of the prediction unit 500. The motion search result storage unit 206 therefore does not store the cost value of the correspondence vector 707. As a result, the search center determination unit 204 cannot refer to the cost value of the correspondence vector 707, and cannot compare the cost value of the correspondence vector 707 with the cost value of the correspondence vector 706 or 707.

In this manner, when the search center determination unit 204 cannot refer to the cost value of one or more of the correspondence vectors, the search center determination unit 204 defines a sum of a parameter value set in advance by a user or the like (a fixed value) and the motion vector cost value as the cost value of a correspondence vector which cannot be referenced. This enables the search center determination unit 204 to compare the cost value of a correspondence vector which can be referenced with the cost value of a correspondence vector which cannot be referenced.

An example of operations performed by the coding device 1 will be described next with reference to FIGS. 6 to 8.

Figure 9:
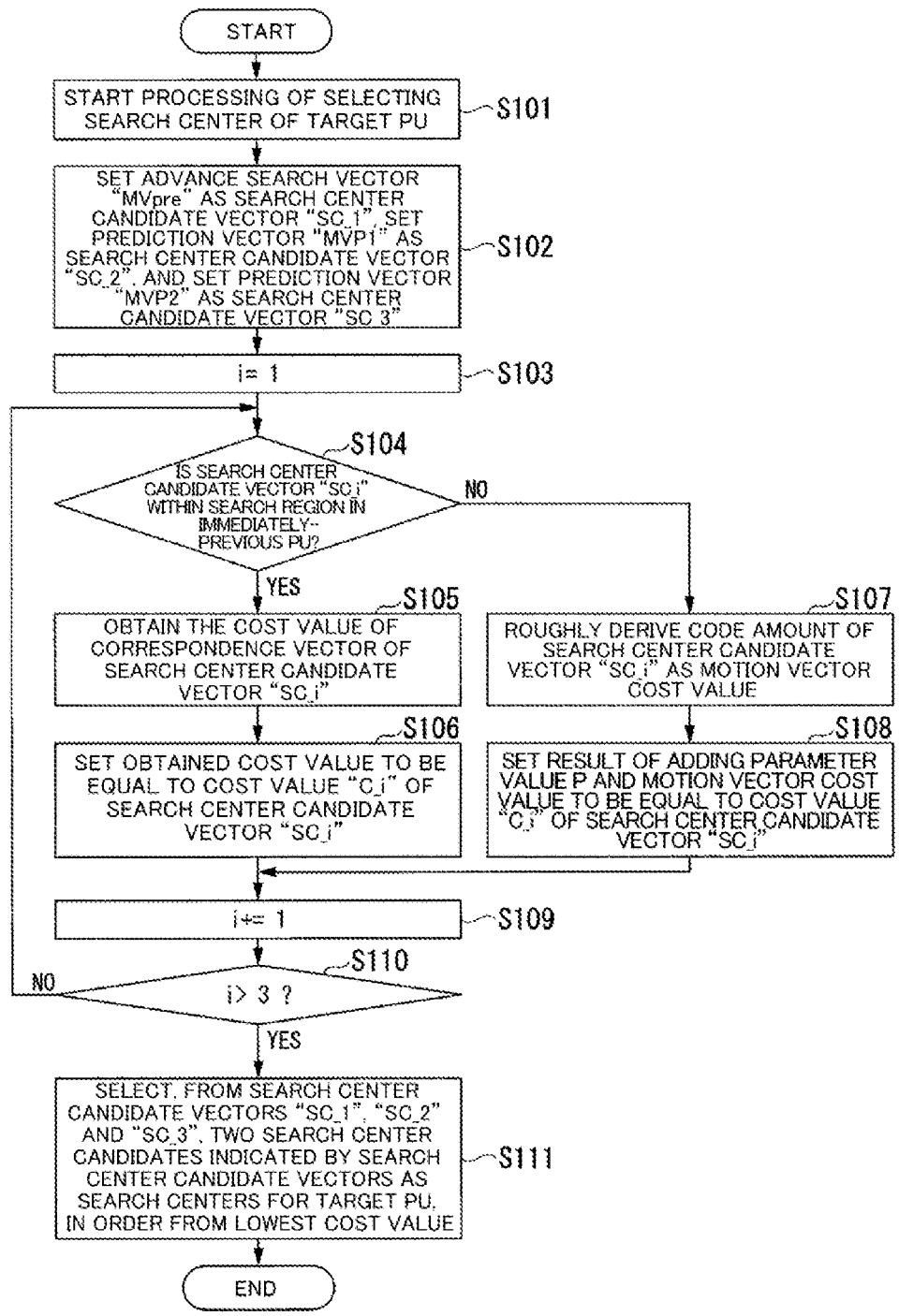
FIG. 9 is a flowchart illustrating an example of operations performed by the coding device according to an embodiment.

FIG. 9 is a flowchart illustrating an example of operations performed by the coding device 1. The search center determination unit 204 starts processing of selecting the search center of the target prediction unit 501 (step S101).

The search center determination unit 204 obtains the advance search vector 703 "MVpre_2" indicated in FIG. 6 from the advance search process processing unit 202. The search center determination unit 204 sets the advance search vector 703 "MVpre_2" as a search center candidate vector "SC_1". The search center determination unit 204 obtains the prediction vector 704 "MVP1_2" and the prediction vector 705 "MVP2_2" from the prediction vector generation unit 203. The search center determination unit 204 sets the prediction vector 704 "MVP1_2" as a search center candidate vector "SC_2". The search center determination unit 204 sets the prediction vector 705 "MVP2_2" as a search center candidate vector "SC_3" (step S102).

To set cost values for the search center candidate vectors "SC_1", "SC_2", and "SC_3" in the processing from step S103 to step S110, the search center determination unit 204 substitutes 1 for an index "i" (step S103).

The search center determination unit 204 determines whether or not the search center of a search center candidate vector "SC_i" is within the search region 600 in the prediction unit 500 (immediately before the prediction unit 501) (step S104).

In the following case, the search center determination unit 204 obtains, from the motion search result storage unit 206, the cost value of a correspondence vector of the search center candidate vector "SC_i" (a vector corresponding to the search center candidate vector "SC_i") (step S105). The stated case is a case where the search center of the search center candidate vector "SC_i" is within the search region 600 in the prediction unit 500 (step S104: YES).

The search center determination unit 204 sets the cost value of the obtained correspondence vector to be equal to a cost value "C_i" of the search center candidate vector "SC_i" in the prediction unit 501 (step S106).

When the search center of the search center candidate vector "SC_i" is outside the search region 600 in the prediction unit 500 (step S104: NO), the cost value of the correspondence vector is not stored in the motion search result storage unit 206. Accordingly, the search center determination unit 204 roughly derives the code amount of the search center candidate vector "SC_i" produced when the search center candidate vector "SC_i" is coded as the motion vector cost value. For example, the method through which the search center determination unit 204 derives the motion vector cost value may be the same as the method through which the motion search processing unit 205 derives the code amount of the motion vector (the motion vector cost value) (step S107).

The search center determination unit 204 sets a result of adding a parameter value "P" (a fixed value) set in advance by a user or the like and the motion vector cost value (a total value) to be equal to the cost value "C_i" of the search center candidate vector "SC_i" (step S108).

The search center determination unit 204 adds 1 to the index "i" (step S109).

The search center determination unit 204 determines whether or not the index value is greater than the number of search center candidate vectors, i.e., 3 (step S109). If the value of the index "i" is less than or equal to the number of search center candidate vectors, i.e., 3 (step S109: NO), the search center determination unit 204 returns the processing to step S104.

If the value of the index "i" is greater than the number of search center candidate vectors, i.e., 3 (step S109: YES), the search center determination unit 204 compares the cost values of the search center candidate vectors "SC_1", "SC_2", and "SC_3". The search center determination unit 204 selects two search center candidate vectors in order from the vector having the lowest cost value. The search center determination unit 204 selects the search center candidates indicated by the two selected search center candidate vectors as the search centers for the target prediction unit 501 (the current PU) (step S111).

The parameter value "P" in step S108 is a value corresponding to the sum of absolute differences (SAD or SATD) expressing a differential cost value, and functions as a threshold with respect to cost values aside from the differential cost value (motion vector cost values). The descriptions assume that as indicated in FIG. 8, only the one search center candidate 804 among the three search center candidates 803 to 805 is outside the search region 600 of the prediction unit 500.

When the cost values of the search center candidate vectors indicating the two search center candidates 803 and 805 within the search region 600 are lower than the following cost value, the search center determination unit 204 takes the two search center candidates 803 and 805 as the search centers of the prediction unit 501. The stated following cost value is the cost value of the search center candidate vector indicated by the search center candidate 804, i.e., "parameter P+motion vector cost value".

When the cost values of the search center candidate vectors indicating the two search center candidates 803 and 805 within the search region 600 are higher than the following cost value, the search center determination unit 204 does not select the two search center candidates 803 and 805 as the search centers of the prediction unit 501. The stated following cost value is the cost value of the search center candidate vector indicated by the search center candidate 804, i.e., "parameter P+motion vector cost value".

When the cost values of the search center candidate vector indicated by the two search center candidates 803 and 805 within the search region 600 are equal to the cost value of the search center candidate vector indicated by the search center candidate 804, the parameter value "P" functions as a threshold with respect to the motion vector cost value.

If two or more search center candidates among the three search center candidates are outside the search region 600 of the prediction unit 500 (the immediately-previous PU), the parameter "P" is canceled out by comparing the cost values of the search center candidate vectors indicating the search center candidates outside the search region 600. Accordingly, the search center determination unit 204 selects the search center candidate indicating the search center candidate vector with a low motion vector cost value as the search center of the prediction unit 501.

As described thus far, the coding device 1 according to the embodiment executes coding after dividing (shaping) an image into target blocks. The coding device 1 according to the embodiment includes the search center determination unit 204 (a candidate obtainment unit, an evaluation information obtainment unit, and a selection unit). The search center determination unit 204 obtains a plurality of search center candidate vectors (provisional motion vector candidates) in a coding target block. The search center determination unit 204 obtains a correspondence vector which is a vector having the same direction and magnitude as the direction and magnitude of the obtained search center candidate vector. The search center determination unit 204 obtains evaluation information of the search center indicated by the correspondence vector in a coded target block. On the basis of the evaluation information, the search center determination unit 204 selects, from the plurality of search center candidate vectors, a number of search center candidate vectors (motion vector candidates) that is lower than the number of the plurality of search center candidate vectors.

Through this, the coding device 1 according to the embodiment uses the results of the motion search for an already-coded block to narrow down the motion vector candidates. The coding device 1 according to the embodiment determines the search center candidates on the basis of the results of the formal motion search processing performed on the blocks in the periphery of the target block, without loading the pixel values. In other words, the coding device 1 according to the embodiment compares the cost values (evaluation information) of the search center candidates indicated by the correspondence vectors for the accurate prediction vectors of the motion vector prediction (MVP), and selects the search center candidate vector for the current prediction block on the basis of a result of the comparison, without additionally executing the advance search processing (an additional cost). In this manner, the coding device 1 according to the embodiment can suppress a drop in coding efficiency even when a search processing amount has been reduced.

By narrowing down the search center candidates on the basis of past search results, the coding device 1 according to the embodiment need not execute additional search processing and the like, which makes it possible to greatly reduce the search processing amount. By narrowing down the correspondence vectors for each prediction unit in the formal motion search processing, the coding device 1 according to the embodiment can suppress a drop in the coding performance caused by differences in the sizes of the two blocks described next. The first is the size of the blocks in the advance search processing. The second is the size of the blocks in the formal motion search processing. The coding device 1 according to the embodiment can ensure that no discrepancies arise in the prediction vectors of the motion vector prediction between the advance search processing and the formal motion search processing. Particularly when the block size of the prediction unit is small, such as 8×8 pixels, a shift of a single prediction unit is unlikely to make a major difference in the relative merits of the search center candidates. As such, the cost value of the search center candidate vector of the current prediction unit (current PU) being evaluated on the basis of the search results of the immediately-previous prediction unit (immediately-previous PU) does not greatly affect the correspondence vector selection result.

In the embodiment described above, the motion search result storage unit 206 stores only the search results for the immediately-previous prediction unit, as one example. When the current prediction unit (current PU) is located at the left edge of the frame, the immediately-previous prediction unit (immediately-previous PU) is located at the right edge of the frame. As such, there is a great distance between the current prediction unit and the immediately-previous prediction unit, which results in low correlation between the search results, and may cause a drop in the coding performance depending on the result of the correspondence vector selection. The motion search result storage unit 206 may store not only the search result of the immediately-previous prediction unit, but also the search result of the most recent prediction unit relative to the current prediction unit located at the left edge of the frame of the original image. In this case, if the search center candidate of the prediction unit on the left edge of the frame is selected, the search center determination unit 204 may use not only the search result for the immediately-previous prediction unit, but also the search result of the most recent prediction unit at the left edge of the frame. In this manner, when the coding target block (prediction unit) is not a block on the left edge of a frame of the original image, the most recent prediction unit is a block to the left, for example, of the coding target block. When the coding target block is a block on the left edge of a frame of the original image, the most recent prediction unit is a block above, for example, the coding target block. Because the search center determination unit 204 can use a past search result from the prediction unit directly above the current prediction unit in the frame (a search result highly correlated with the current PU), a drop in the coding performance can be suppressed.

In the embodiment described above, the search center determination unit 204 obtains the cost value of a single correspondence vector in the immediately-previous prediction unit (the cost value of a single search center) from the motion search result storage unit 206. The cost value may be the total value of the cost values of a plurality of search center candidate vectors (the cost values of a plurality of search centers). For example, the search center determination unit 204 obtains the cost values of the correspondence vectors in the result of the formal motion search processing performed on the immediately-previous prediction unit, for a total of nine search center candidates ±1 points above, below, to the left, and to the right, centered on the search center candidate indicated by the search center candidate vector in the current prediction unit. The search center determination unit 204 may select the search center candidate vector by comparing the obtained cost values. The cost value may be the median value of the cost values of a plurality of search center candidate vectors (the cost values of a plurality of search centers). As a result, the search center determination unit 204 can select a search center candidate vector having more accurately compared the cost values, without being affected by noise and the like in the image.

The following can be given as an example of a summary of the foregoing.

The coding device 1 according to the embodiment executes motion search processing and pixel value prediction using a temporal correlation of a reference image with respect to an input image. The coding device 1 according to the embodiment includes a reduced image generation unit, an advance motion search processing unit, a prediction vector generation unit, a prediction vector generation unit, a search center determination unit, a motion search processing unit, and a motion search result storage unit. The reduced image generation unit performs reduction processing on the input image and the reference image. The advance motion search processing unit determines a first motion vector by executing advance motion search processing using a coding target block of a reduced input image and a search region for an advance motion search in a reduced reference image, the images having been reduced at the same ratio by the reduced image generation unit. The prediction vector generation unit derives two prediction vectors for MVP from the peripheral blocks of the target coding block and sets those prediction vectors as a second motion vector and a third motion vector. Using a motion search result of a past block, stored in the motion search result storage unit, the search center determination unit selects no more than two vectors from among the three vectors, i.e., the first motion vector, the second motion vector, and the third motion vector, and determines the selected vectors as vectors indicating a search center of the coding target block.

The motion search processing unit determines a search region for an actual motion search on the basis of the search center indicated by the two vectors determined by the search center determination unit, and executes motion search processing on each of points within the search region for the actual motion search. Here, the motion search processing unit defines a sum of a sum of absolute differences and a motion vector cost value as a search cost value for each point in the search region for the actual motion search. Here, the sum of absolute differences is a sum of absolute differences between the original image and the reference image indicated by the motion vector (SAD) or a sum of absolute differences of values resulting from performing a two-dimensional Hadamard transform on difference values (SATD). The motion vector cost value is a motion vector cost value obtained by roughly estimating a code amount produced when the motion vector is coded. The motion search processing unit searches for a point with the lowest search cost value. The motion search result storage unit stores the motion vector results at each point in the search region for the actual motion search and the corresponding search cost values, which have been derived by the motion search processing unit, for a single coding target block. The search center determination unit takes three motion vectors, i.e., the first motion vector, the second motion vector, and the third motion vector, as search center candidates.

The search center determination unit determines whether or not the same vector as the search center candidate is present among the plurality of motion vectors stored in the motion search processing unit. If there is a vector which is the same as a search center candidate, the search center determination unit sets the search cost value which is stored in the motion search processing unit and corresponds to the same vector as a search center cost of the search center candidate.

If there is no vector that is the same as a search center candidate, the search center determination unit derives a code amount produced when the vector of the search center candidate is coded through the same method as that used by the motion search processing unit to derive the motion vector cost value, and takes that code amount as a search center vector cost value. If there is no vector that is the same as the search center candidate, the search center determination unit takes a sum of a difference value parameter, which can be set to any desired value, and the search center vector cost value as the cost value of the search center of the search center candidate. Through this, the search center determination unit determines the search center cost value of each of the search center candidates for the three motion vectors, i.e., the first motion vector, the second motion vector, and the third motion vector. Of the three search center cost values, the search center determination unit determines the two search centers having the lowest values. The search center determination unit then determines the two search center candidates corresponding to the respective cost values as the search centers for the coding target block.

The motion search result storage unit stores the motion vector result at each point in the search region for the actual motion search, and the search cost values corresponding thereto, in the single block which was most recently derived (a first block). The motion search result storage unit also stores the most recently-derived block at the left edge side of the screen as a second block. When the coding target block is not the block at the left edge of the screen, the search center determination unit determines, for the first block which is the one most recently-derived block, whether or not there is a vector identical to the search center candidate among the motion vector results stored in the motion search processing unit. When the coding target block is the block at the left edge of the screen, the search center determination unit determines, for the second block which is the one most recently-derived block at the left edge of the screen, whether there is a vector (a correspondence vector) identical to the search center candidate among the motion vector results stored in the motion search processing unit. If a vector identical to the search center candidate is present, the search center determination unit sets a search cost value which corresponds to that identical vector (the correspondence vector) and which is stored in the motion search processing unit as the cost value of the search center of the search center candidate.

The coding device in the foregoing embodiment may be implemented by a computer. In this case, a program for implementing these functions may be recorded in a computer-readable recording medium, and the functions may be implemented by loading the program recorded in the recording medium into a computer system and executing the program. Here, "computer system" is assumed to include an OS, hardware such as peripheral devices, and the like. Additionally, "computer-readable recording medium" refers to a portable medium such as a flexible disk, a magneto-optical disk, ROM, a CD-ROM, or the like, or a storage device such as a hard disk which is built into the computer system. Furthermore, the "computer-readable recording medium" may also include a medium which holds the program for a set length of time, e.g., a medium that holds a program dynamically for a short period of time, such as a communication line in the case of transmitting a program over a network such as the Internet or a communication line such as a telephone line, or volatile memory within the computer system that serves as a server or client in such a case. The stated program may implement only some of the above-described functions, and may further be capable of implementing the above-described functions in combination with programs already recorded in the computer system, or may be implemented using a programmable logic device such as an FPGA (Field Programmable Gate Array).

Although an embodiment of this invention have been described in detail above with reference to the drawings, the specific configuration is not limited to the embodiment, and designs and the like within the scope of the present invention are included.

For example, the decoding device may include at least some of the functional units of the coding device 1. In the embodiment described above, the coding device 1 sends the search result of the motion search processing to the decoding device. However, instead of the coding device 1 transmitting the search result of the motion search processing to the decoding device, the decoding device may obtain the search result of the motion search processing by executing the same processing as the motion search processing executed by the coding device 1.

INDUSTRIAL APPLICABILITY

The present invention can be applied in a coding device that codes a moving image.

REFERENCE SIGNS LIST

1 Coding device
101 Original image shaping unit
102 Intra-prediction processing unit
103 Inter-prediction processing unit
104 Prediction residual signal generating unit
105 Transform/quantization processing unit
106 Entropy coding unit
107 Inverse quantization/inverse transform processing unit
108 Decoded signal generating unit
109 Loop filter processing unit
201 Reduced image generation unit
202 Advance search process processing unit
203 Prediction vector generation unit
204 Search center determination unit
205 Motion search processing unit
206 Motion search result storage unit
301 Target block
302-306 Pixel
400 Coding tree unit
401-404 Advance search unit
500-501 Prediction unit
600 Search region
601-603 Search range
700 Advance search vector
701 Prediction vector
702 Prediction vector
703 Advance search vector
704 Prediction vector
705 Prediction vector
706-708 Correspondence vector
803-805 Search center candidate

The invention claimed is:

1. A coding device that executes coding having divided an image into blocks, the device comprising:
   a processor; and
   a storage medium having computer program instructions stored thereon, when executed by the processor, perform to:
   receive a coding target block from the blocks comprising the image;
   receive one or more provisional motion vector candidates, where the one or more provisional motion vector candidates is derived from the coding target block;
   obtain a correspondence vector and evaluation information of a search center indicated by the correspondence vector in a coded block from a motion search result storage unit, where the correspondence vector has same direct and same magnitude as the one or more provisional motion vector candidates and results from a motion search performed earlier in time on a different block from the image;
   and, on the basis of the evaluation information, selects, from the one or more provisional motion vector candidates, a number of motion vector candidates that is lower than the number of the one or more provisional motion vector candidates.

2. The coding device according to claim 1, wherein the correspondence vector is the provisional motion vector candidate when the coded block is the coding target block.

3. The coding device according to claim 1, wherein the computer program instructions further perform to sets the evaluation information of the provisional motion vector candidate of the correspondence vector for which a search center is located in a search region of the coded block to be equal to the evaluation information of the correspondence vector; and sets the evaluation information of the provisional motion vector candidate of the correspondence vector for which a search center is not located in the search region of the coded block to be equal to a result of adding a code amount of the provisional motion vector candidate after being coded and a fixed value.

4. The coding device according to claim 3, wherein the evaluation information of the correspondence vector is a value of a result of adding a code amount of the provisional motion vector candidate after being coded and a sum of absolute differences of a pixel value.

5. The coding device according to claim 1, wherein the coded block: is a block to the left of the coding target block when the coding target block is not a block at a left edge of the image; and is a block above the coding target block when the coding target block is a block at the left edge of the image.

6. The coding device according to claim 1 wherein the one or more provisional motion vector candidates includes a prediction vector, where the prediction vector is result of a motion search in the coding target block on the basis of motion vectors for blocks surrounding the coding target block.

7. The coding device according to claim 6 wherein the one or more provisional motion vector candidates includes an advanced search vector derived from the image and a reference image.

8. The coding device according to claim 1 further comprises selecting a given provisional motion vector from the one or more provisional motion vector candidates and executing a motion search in a region indicated by the given provisional motion vector.

9. A non-transitory computer-readable medium having computer-executable instructions that, upon execution of the instructions by a processor of a computer, cause the computer to function as the coding device according to claim 1.

\* \* \* \* \*